July 6, 1948.                    O. F. BAUER                    2,444,551
                              GEAR CUTTING MACHINE
Filed Nov. 9, 1944                                          7 Sheets-Sheet 1

Inventor
OLIVER F. BAUER
By
B. F. Schlesinger
Attorney

Inventor
OLIVER F. BAUER
By B. F. Schlesinger
Attorney

July 6, 1948.  O. F. BAUER  2,444,551
GEAR CUTTING MACHINE
Filed Nov. 9, 1944  7 Sheets-Sheet 4

Inventor
OLIVER F. BAUER
By B. E. Schlesinger, Attorney

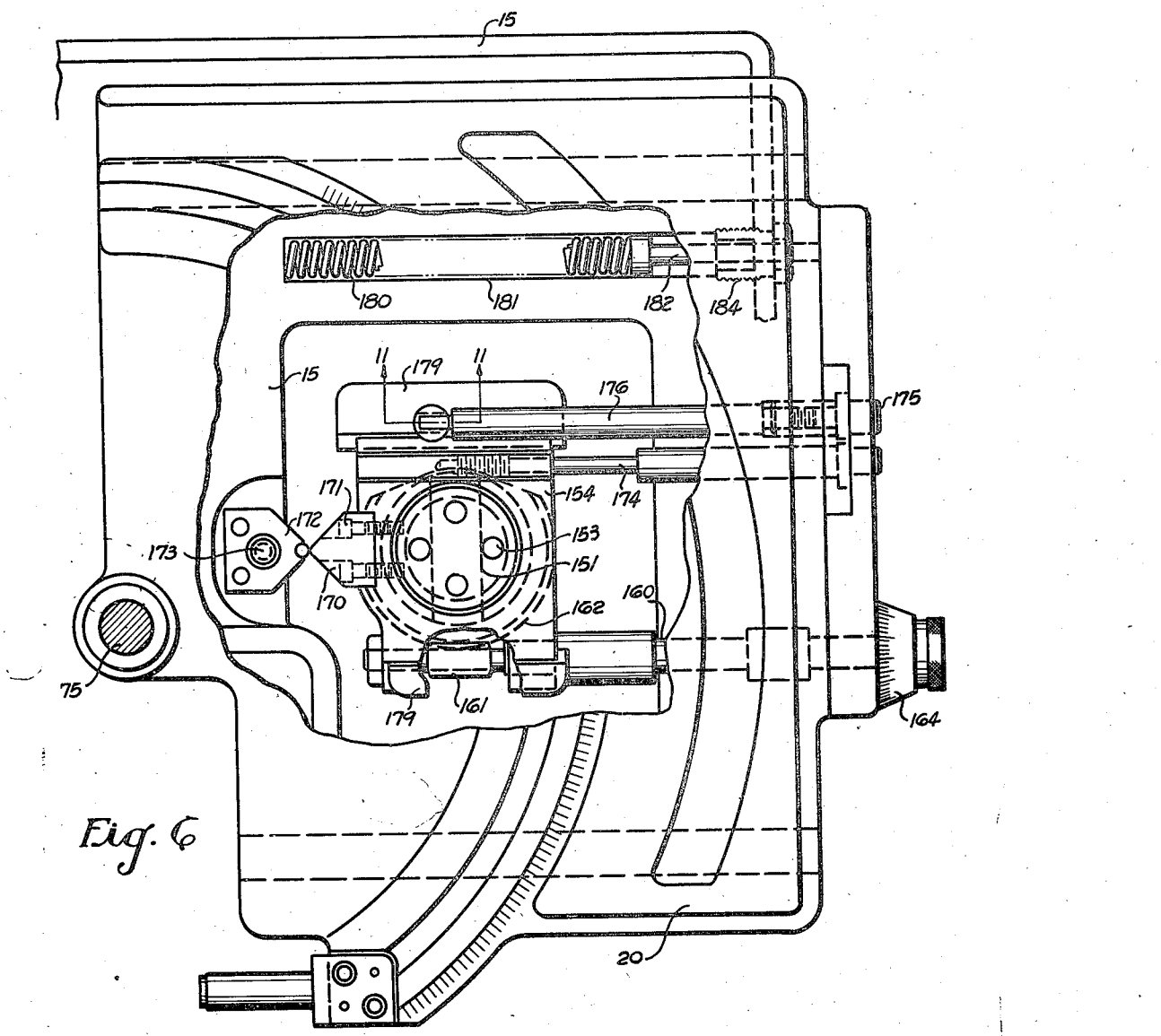
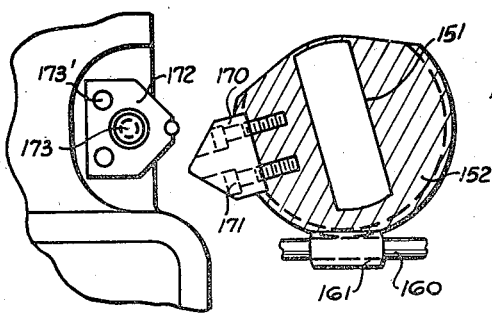

Patented July 6, 1948

2,444,551

UNITED STATES PATENT OFFICE 2,444,551

GEAR-CUTTING MACHINE

Oliver F. Bauer, East Rochester, N. Y., assignor to Gleason Works, Rochester, N. Y., a corporation of New York Application November 9, 1944, Serial No. 562,608

13 Claims. (Cl. 90—5)

The present invention relates to machines for producing gears and particularly to machines for generating spiral bevel gears of small size.

In the generation of spiral bevel gears, a face-mill gear cutter is ordinarily used as the cutting tool, and, as the cutter rotates in engagement with the work, the cutter and the work are rolled relative to one another as though the gear, which is being cut, were rolling with a basic gear represented by the cutter. It has been proposed to cut spiral bevel gears by continuous indexing processes, but conventional spiral bevel gear cutting machines operate according to the intermittent indexing process. In a machine operating by the intermittent indexing process, the operating cycle comprises movement of the cutter and work into operative relation, roll of the rotating cutter and work together to generate a tooth side or a tooth space of the work, withdrawal of the cutter from engagement with the work, and indexing of the work.

Heretofore, small-sized spiral bevel gear generators have been of the "segment-roll" type, that is, they have been so constructed that the generating roll is produced by a pair of segments, one of which is connected to the work spindle and the other of which has a fixed relation to the cutter. Either the work or the cutter may be mounted on an oscillatory cradle which is oscillated and which, when oscillated, causes one segment to roll on the other, imparting rotation to the work spindle in time with the cradle movement. This timed rotation of the cradle and work spindle constitutes the generating roll of the machine.

"Segment-roll" machines are more or less special purpose machines, because for each different job, ordinarily, at least a different work segment has to be employed. Moreover, when the machine is provided with a notched-plate type of index mechanism, different notched plates have to be used when gears of different tooth numbers are to be cut. The smaller type spiral bevel gear generators as heretofore built have, therefore, not been particularly suited to jobbing work because of the number and the cost of the segments and of the index plates required to cover the full range of the machine.

Some small spiral bevel gear generators have been built which are of the "geared-roll" type. In these machines, the generating roll is effected through a train of gearing which drives the oscillatory cradle and the work spindle in the required timed relation. These machines have one advantage, so far as jobbing work is concerned, namely, the ratio of roll can be varied for different jobs simply by substitution of different change gears. These machines as heretofore built, however, have also employed a notched-plate type of index mechanism.

It is ordinarily desirable to cut simultaneously both sides of each tooth space in small-sized spiral bevel gears. Where both members of the pair are cut in this manner, however, bias bearing will be encountered when the two members of the pair are run together, unless some special method of generating the gears is employed to obviate this bearing condition. One known method is disclosed in the Wildhaber Patent No. 1,980,365 of November 13, 1934. In this method in addition to the conventional motions, an added motion is effected between cutter and work in the direction of the axis about which the generating roll is taking place. This method can be practiced on gear-cutting machines of known construction, both of the "segment-roll" and of the "geared-roll" type, by forming the cam, which produces movement of the work into and out of operative engagement with the tool, so that this cam will, during generation, produce the required additional movement in the direction of the axis of generation.

Because this additional movement is in the direction of the axis about which the rolling motion takes place, it is conventionally termed "a helical motion." The amount of helical movement, which is required, is small compared with the amount of movement necessary to move the tool and work into and out of operative relation. It is difficult, therefore, to design suitable cams to perform both functions. Further than this, when the helical motion is employed, a different cam is required for each different job.

A primary object of this invention is to provide a machine for generating small-sized spiral bevel gears which will be much more universal than any such machine heretofore built.

A further object of the invention is to provide a spiral bevel gear generating machine for small-sized work in which the indexing mechanism, as such, may be eliminated entirely.

Another object of the invention is to provide a spiral bevel gear generating machine for cutting gears with a helical motion in which a simple and practical control mechanism is provided for governing the helical motion.

Still another object of the invention is to provide a spiral bevel gear generating machine for cutting gears with a helical motion in which a single cam may be used to effect with this motion the cutting of all jobs within the range of the machine.

Other objects of the invention will be apparent hereinafter from the specification and from the recital of the appended claims.

In the drawings:

Fig. 6 is a fragmentary plan view, with parts broken away, showing the sliding base and frame of the machine;

Fig. 7 is a fragmentary view showing the positive stop of the machine and, in section, the adjustable block, which is adapted to engage therewith, the latter being in a position such as it would occupy where helical motion is employed;

Fig. 11 is a fragmentary sectional view on the line 11—11 of Fig. 6; and

Reference will now be had to the drawings for a more detailed description of the invention. The various parts of the machine are identified in the different figures by like numerals of reference.

Figure 3:
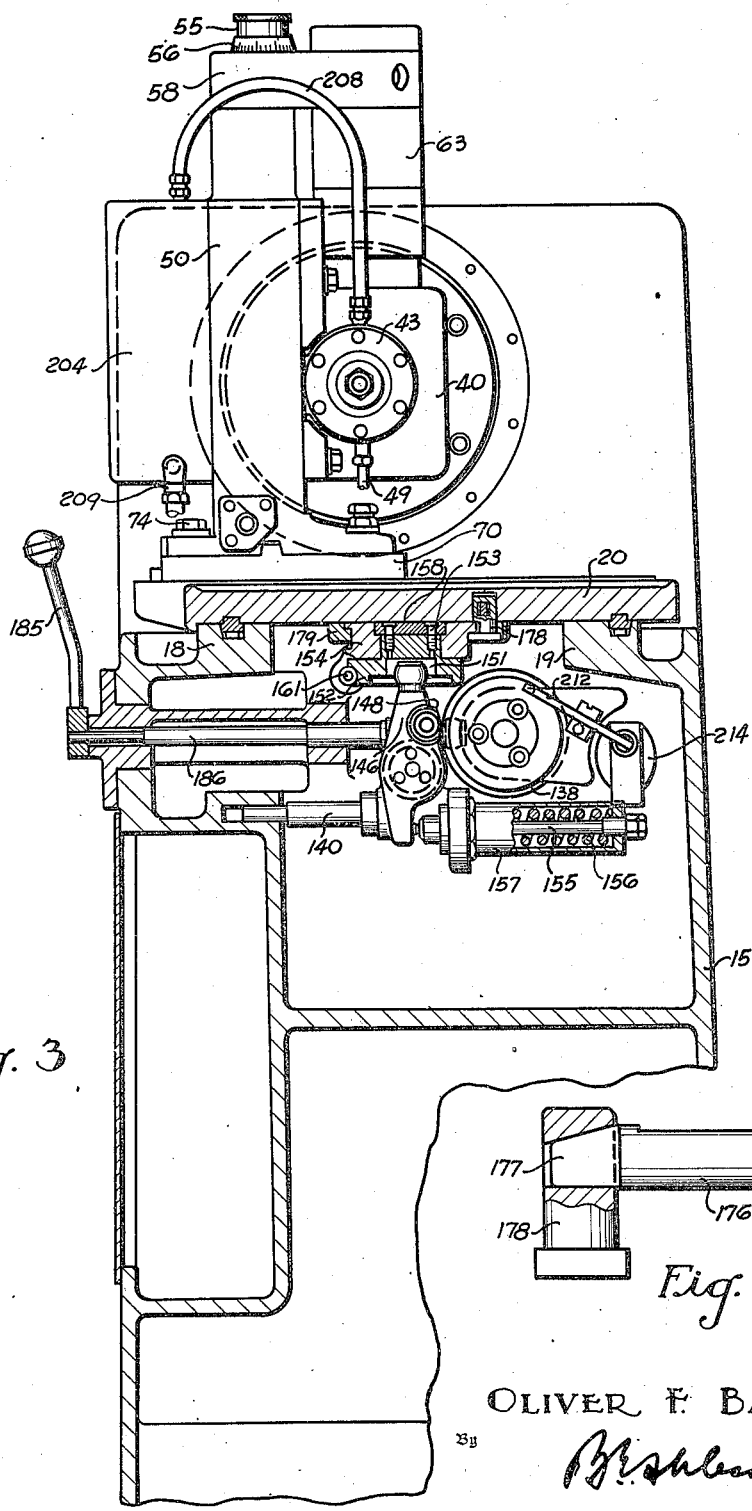
Fig. 3 is a partial end elevational view of the machine, with parts broken away.

15 denotes the bed or frame of the machine. This is formed at one end with an upright or column 16 (Fig. 1) in which the cradle 17 is journaled. It is also formed on its upper face with ways 18 and 19 (Fig. 3) on which the sliding base 20 travels.

Figure 2:
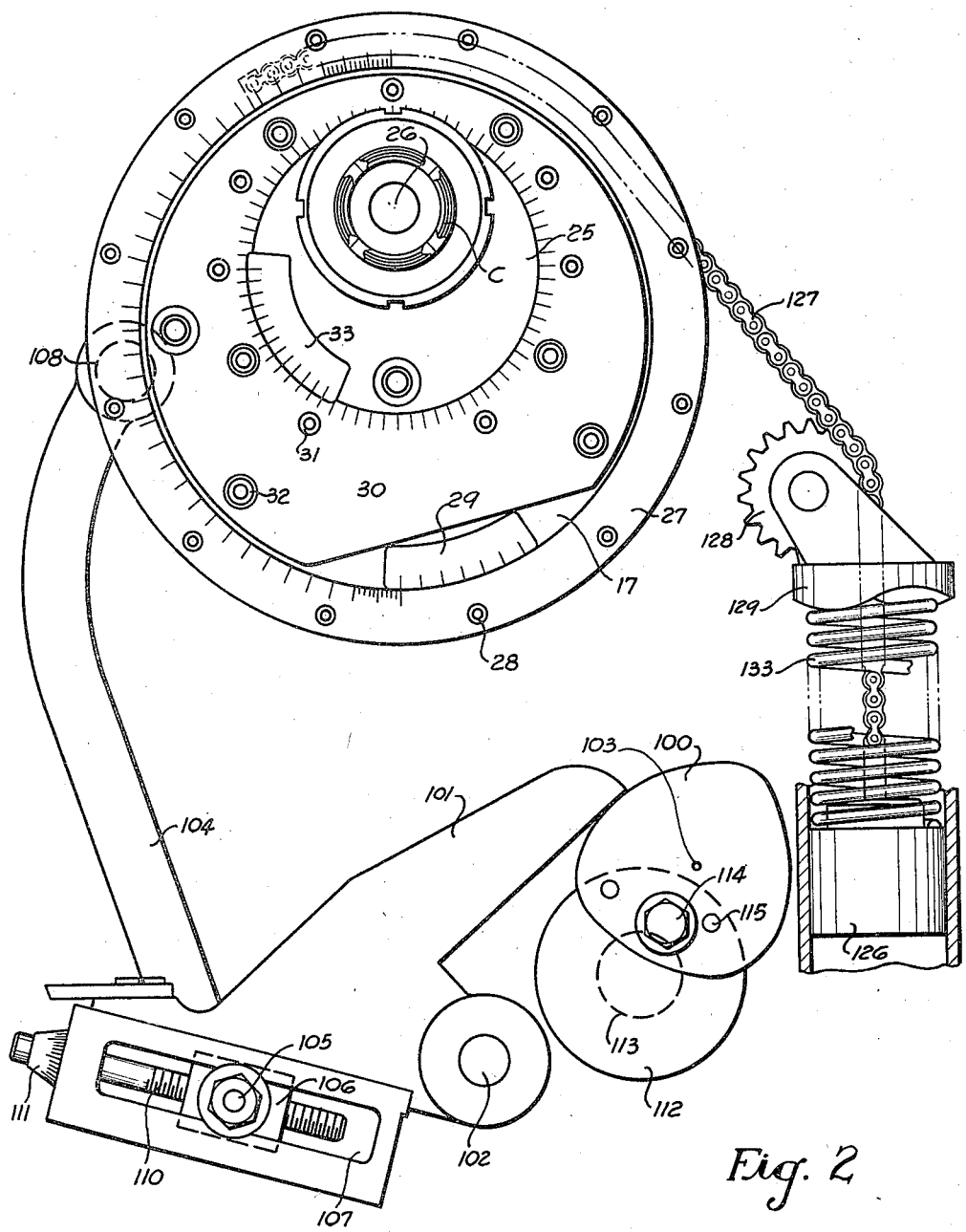
Fig. 2 is a more or less diagrammatic view on an enlarged scale showing particularly the tool-carrying cradle and the mechanism for oscillating the same.

The cradle 17 is provided with an eccentric bore in which is adjustably mounted the cutter carrier 25 (Fig. 2). The cutter carrier 25 is itself eccentrically bored and in this eccentric bore is journaled the cutter spindle 26. To this spindle there is secured in the usual manner a face-mill gear cutter C, here shown as provided with four cutting blades.

The cradle 17 is adjustable angularly on the column 16 and the cutter carrier 25 is adjustable angularly in the cradle 17 to position the cutter in accordance with the spiral angle of the teeth which are to be cut on a gear. The cradle is held in column 16 against axial movement by a gib 27 which is fastened to the column by screws 28. The face of this gib 27 is graduated and a vernier 29 is secured to the face of the cradle to read against these graduations and permit of precise angular adjustment of the cradle in the column. There is a plate 30 secured by screws 31 and by bolts 32 to the face of the cradle. This plate is angularly graduated and there is a vernier 33 secured to the face of the carrier 25 to read against these graduations to permit of precise adjustment of the carrier in the cradle. The described mounting and adjustment of the cutter have been used previously on spiral bevel gear generating machines and form no part of the present invention.

Figure 4:
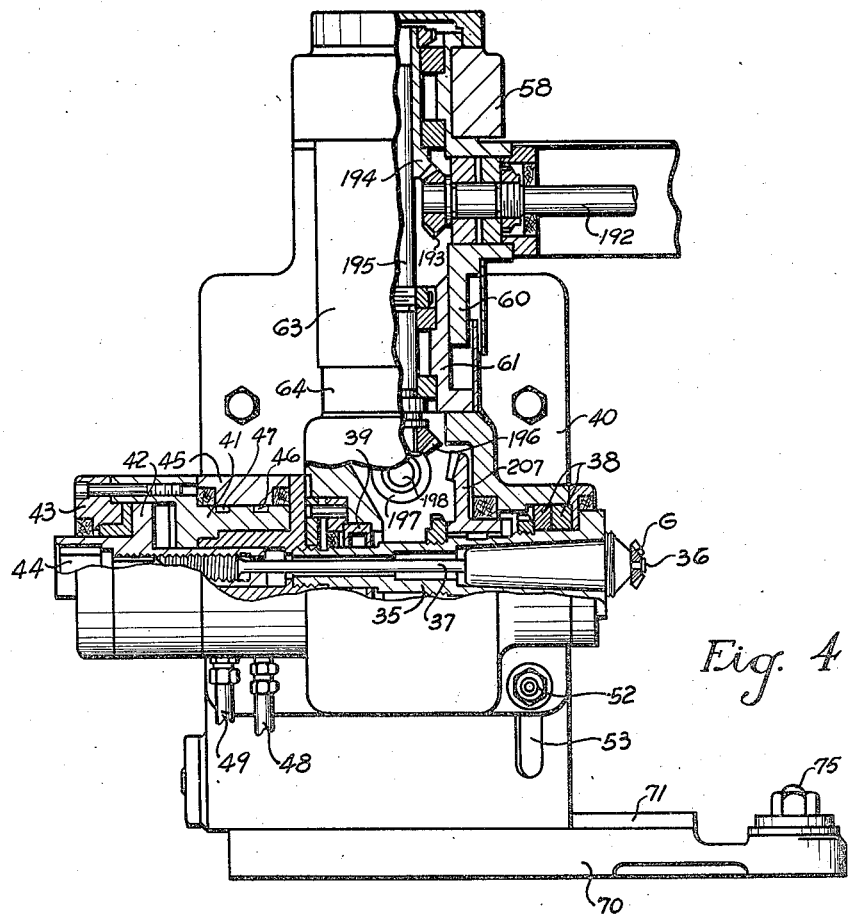
Fig. 4 is a side elevation of the work head and swinging base of the machine, with parts broken away.

The gear G (Figs. 1 and 4), which is to be cut, is secured in any suitable manner to the work spindle 35 (Fig. 4) of the machine, as for instance by the horseshoe washer 36 and draw bar 37. The work spindle is journaled on suitable bearings 38 and 39 in the work head 40 of the machine.

Secured to the work spindle 35 in any suitable manner is a cylinder 41, and in this cylinder there is reciprocably mounted a piston 42. The piston is internally threaded for adjustable connection to the draw bar 37. The piston is held in the cylinder 41 by a cover plate 43. The piston itself projects rearwardly through this cover plate and is provided with a central hole 44 through which access may be had to the draw bar 37 to adjust the same with reference to the piston, as is required in order to chuck gears of different sizes. The piston rotates with the work spindle 35 and is journaled in a plain bearing 45 in the work head 40. The pressure fluid may be supplied to opposite sides of the piston 42 for chucking or dechucking the work through supply lines 48 and 49, respectively, which are connected to the bearing member 45 and which communicate with peripheral grooves 46 and 47, respectively, formed in the cylinder 41. The grooves 46 and 47 communicate through ducts (not shown) with opposite sides of the piston 42.

The work head 40 is mounted for vertical adjustment on a column 50. It may be secured to the column in any position of its vertical adjustment by T-bolts 52 which pass through the work head and engage in T-slots 53 formed in the column. The vertical adjustment of the work head is effected by rotation of a screw shaft (not shown) which passes through an arm 58 and which threads into the column 50. The screw shaft is operated by the knurled knob 55 (Fig. 3) which is provided with a graduated dial 56. The arm 58 seats at one end on the upper face of the column 50 and is secured to the column by screws (not shown). At its other end the arm 58 engages in a peripheral groove formed on a sleeve 60 (Fig. 4) that has a telescoping adjustment on a sleeve 61. Sleeve 61 is secured in any suitable manner to the work head 40. Telescoping guards 63 and 64, which are secured to the sleeve 60 and sleeve 61, respectively, serve to keep dirt and grit from entering the sleeves 60 and 61.

The column 50 is mounted on a swinging base 70 (Figs. 1 and 4) for adjustment thereon in the direction of the axis of the work spindle 35. The column is guided in this adjustment by a V-shaped tongue 71 which is formed on the upper face of the swinging base 70 and which engages in a complementarily shaped groove on the under face of the column. This adjustment may be made precisely through use of a graduated scale 72 which is secured to the column and which is adapted to read against the vernier 73 that is fastened to the swinging base. The column may be secured in any adjusted position by T-bolts 74 which pass through elongated slots in the column and thread into the swinging base 70.

The swinging base 70 is mounted for angular adjustment on the sliding base 20. The angular adjustment of the swinging base on the sliding base is about the axis of a stud 75 (Figs. 1 and 6) which is secured in the sliding base 20 and on which the swinging base is pivoted. A nut 76 which threads onto this stud serves to hold the swinging base against movement axially of the stud.

During operation of the machine, the cutter C rotates continuously on its axis, the cradle 17 is oscillated back and forth about its axis, the work spindle 35 is rotated continuously on its axis, and the sliding base 20 moves, prior to each cutting operation, toward the cradle, to bring the work into operative engagement with the cutter and, after each cutting operation, is moved away from the cradle, to withdraw the work from engagement with the cutter, so that the continued rotation of the work may index the work. If helical motion is employed, the sliding base also has a movement during cutting either toward or from the cradle.

The various parts of the machine are driven from a motor 80 (Fig. 12) which may be mounted at any convenient point on the machine. The armature shaft 81 of this motor is connected through a suitable coupling 82 with a shaft 83. This shaft drives the shaft 84 through the miter gears 85 and 86. Shaft 84 drives a shaft 88 through a set of change gears 89, 90, 91, and 92. The shaft 88 drives a shaft 94 (Figs. 12 and 1) through a pair of miter gears 95 and 96. There is a bevel pinion 97 secured to the shaft 94 and this pinion meshes with a bevel gear 98 that is secured to the rear end of the cutter spindle 26.

Figure 12:
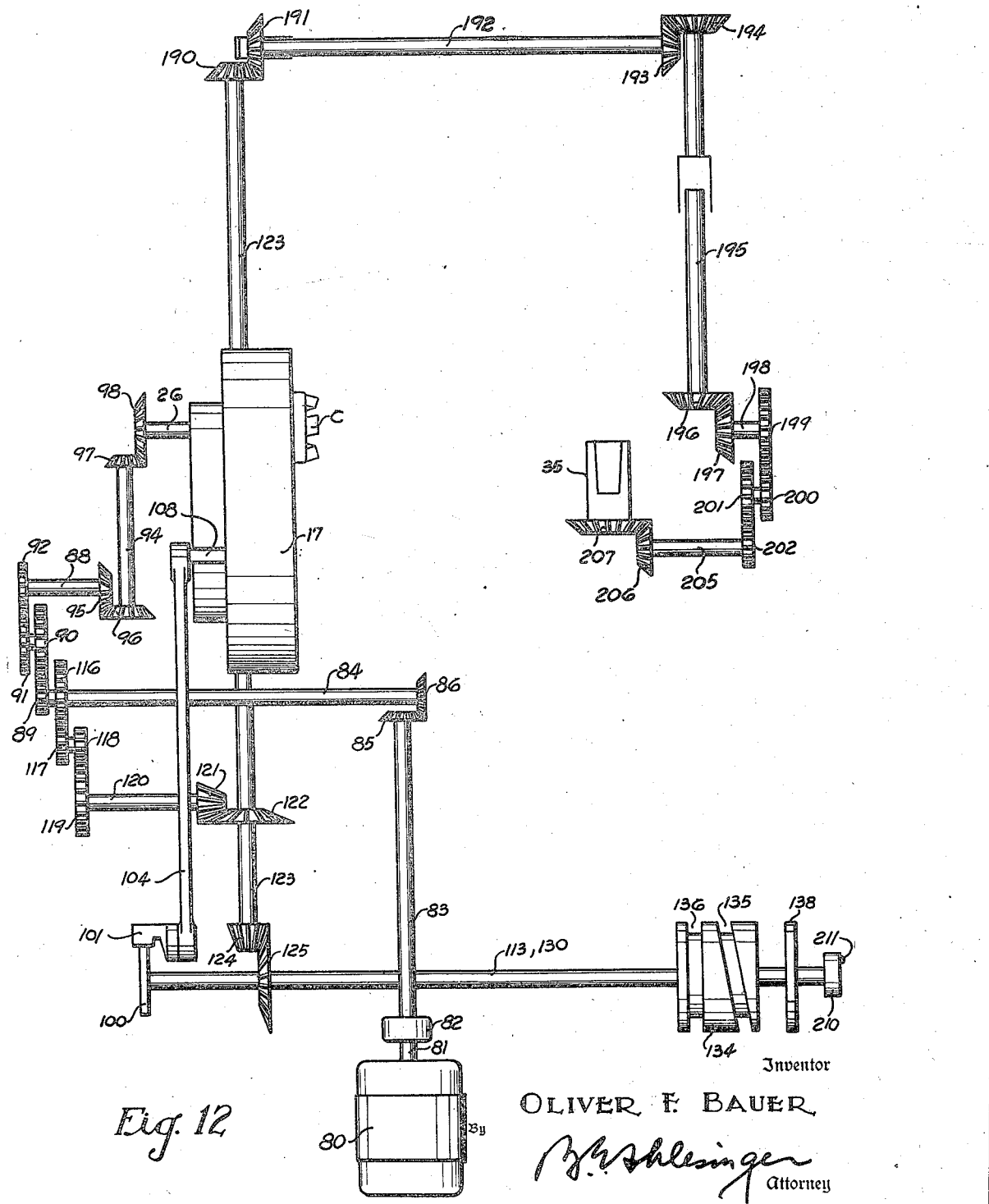
Fig. 12 is a drive diagram of the machine.

The oscillatory movement of the cradle 17 is produced and controlled by a rotary cam 100 (Figs. 2 and 12). This cam is so shaped as to impart motion at a uniform rate to the cradle during generation and to return the cradle to initial position at fast speed when cutting on a tooth surface or a tooth space of the work has been completed. The cam engages one arm of a lever 101 which is pivotally mounted in the bed of the machine on a stud 102. The lever 101 is adjustably connected to a link 104. The link carries a pin 105 at one end which is rotatably mounted in a block 106 that is slidably adjustable in an elongated slot 107 formed in the lever arm 101. The link 104 is adjustably connected at its opposite end through a bolt 108 with the cradle 17. The bolt 108 may engage in an arcuate slot formed in the flange 109 (Fig. 1) of the cradle coaxial of the cradle. This slot should be of sufficient angular extent to permit of the required adjustment of the cradle for gears of different spiral angles.

Adjustment of the block 106 and pin 105 in the slot 107 of lever 101 permits of adjusting the amount of throw of the cradle to conform to the amount of generating roll desired. This adjustment may be effected by rotation of the screw 110 which threads into the block 106 and which is journaled in the lever 101. A graduated dial 111, that is secured to the screw, permits of making this adjustment precisely.

The cam 100 is mounted on a flange-portion 112 of shaft 113 so that the geometric center 103 of the cam is eccentric of the axis of shaft 113. The cam is secured to the flange 112 by a bolt 114 and dowel pins 115.

To counterbalance the cradle 17 and to hold the lever 101 against the periphery of the cam 100, a counterweight 126 is provided. This counterweight (Fig. 2) is connected to the cradle by a chain 127. The chain is guided by a sprocket wheel 128 which is rotatably mounted on a housing 129. This housing is secured in the column or upright 16 and contains the counterweight 126. A coil-spring 133, which is interposed between the upper end of the housing and the weight 126, serves to assist the counterweight in its work.

Figure 1:
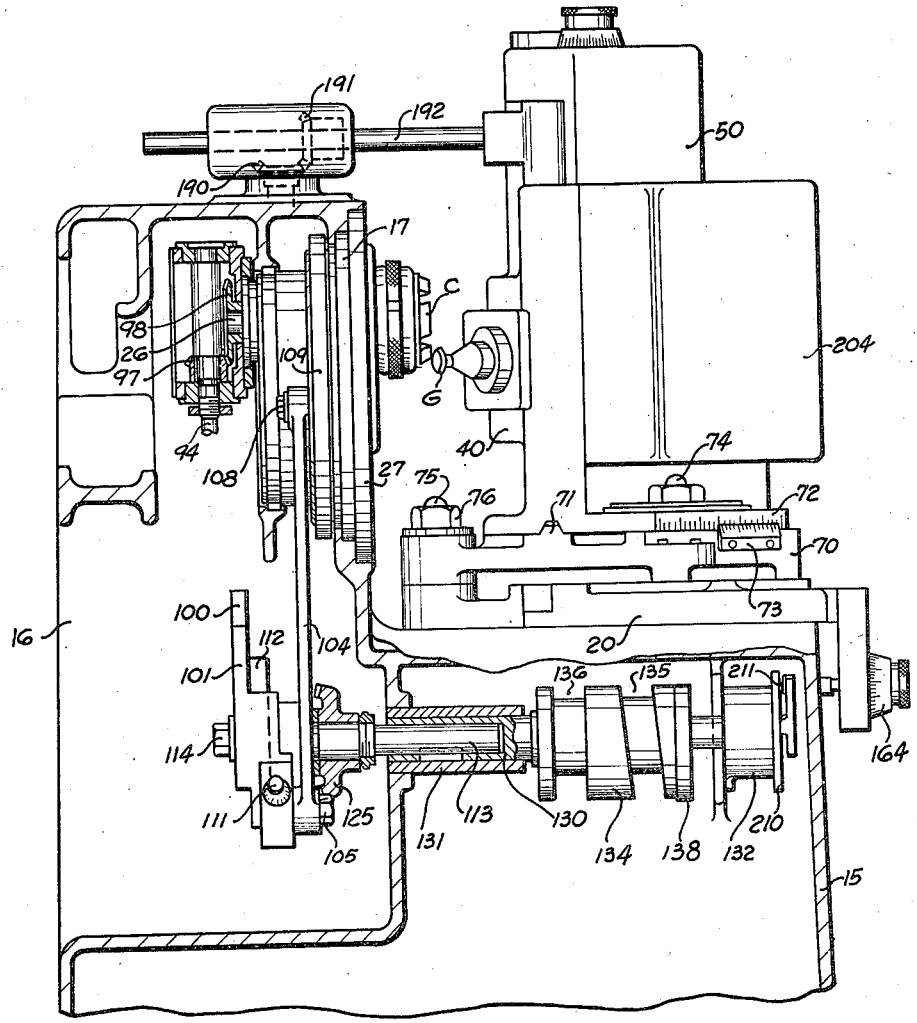
Fig. 1 is a partial side elevational view of a machine built according to one embodiment of the present invention, parts being broken away and shown in section.
Figure 8:
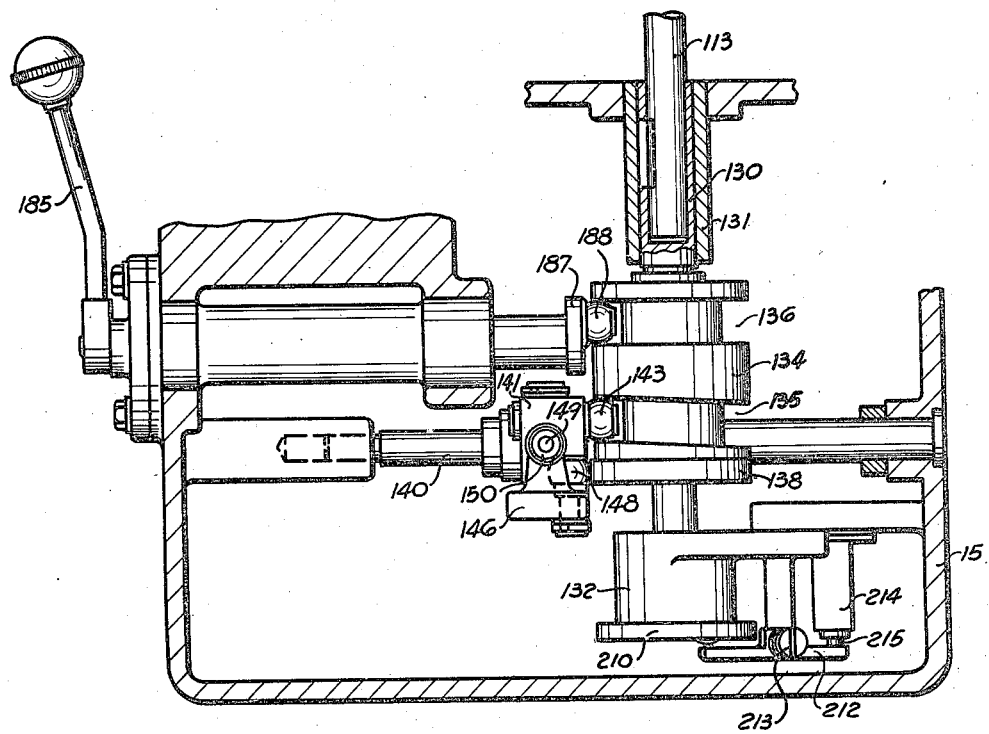
Fig. 8 is a fragmentary sectional view through the bed of the machine showing the feed and helical motion mechanism and the mechanism for moving the sliding base to and from loading position.

The shaft 113 is driven from the shaft 84 through change gears 116, 117, 118, and 119 (Fig. 12), the shaft 120, bevel gears 121 and 122, the shaft 123, bevel pinion 124, and the bevel gear 125 (Figs. 12 and 1). The last named gear is keyed or otherwise fastened to the shaft 113. The shaft 113 fits into one end of a shaft 130 and is keyed to that shaft. The shaft 130 is journaled at one end in a bearing 131 that is secured to the bed of the machine and at its opposite end in a bearing 132 which is also secured to the bed of the machine (Fig. 8).

Keyed or otherwise fastened to the shaft 130 is a control member 134. This control member is formed to have two spaced slots extending around its periphery. One of these slots, the slot 135, is a cam slot and is so formed as to produce feed of the work into the tool prior to generation, dwell of the work in operative position during generation, withdrawal of the work away from the cutter at the end of a generation cycle, and dwell of the work in withdrawn position for a sufficient length of time to permit the continuous rotation of the work to index the work. The slot 136 is a simple annular slot without lead. Its purpose will appear hereinafter.

Secured to or integral with the control member 134 is a cam member 138. The portion of the peripheral surface of this cam, which is in operation during cutting, is formed on a spiral of uniform lead coaxial with the axis of the shaft 130, thereby to produce the helical motion required for elimination of bias bearing.

Figure 10:
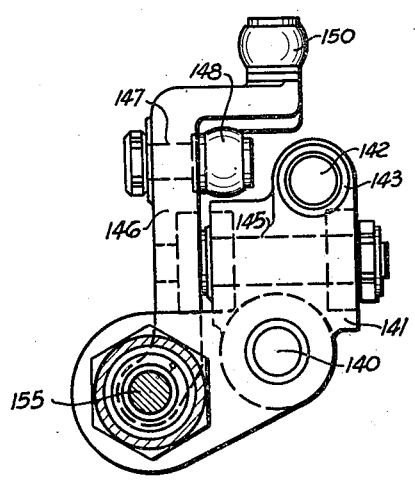
Fig. 10 is a detail view of the two levers which engage, respectively, the feed cam and the helical motion cam and which effect the working movements of the sliding base.
Figure 9:
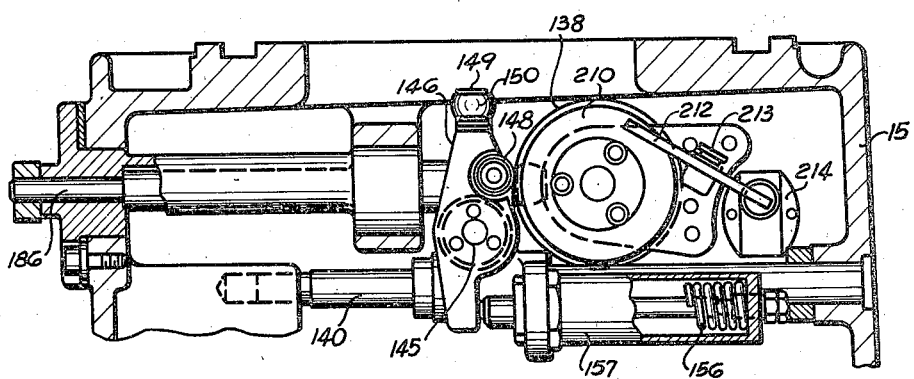
Fig. 9 is a sectional view through the bed of the machine taken at right angles of the view of Fig. 8 and further illustrating these mechanisms.

Pivotally mounted on the stud 140 (Figs. 8, 9, and 10), which is secured in the bed of the machine, is a lever arm 141. Mounted on a stud 142, which is secured in the lever arm 141, is a roller 143. This roller engages in the cam path or slot 135.

Pivotally mounted on a stud 145, which is journaled in the lever arm 141, is a lever 146. Secured in the lever 146 is a stud 147 on which is rotatably mounted the cam roller 148. This cam roller is adapted to engage the periphery of the cam 138. The roller 148 is held in engagement with the peripheral surface of the cam 138 by a spring-pressed plunger 155 (Figs. 3 and 10) which is constantly urged into engagement with the lever 146 by a coil spring 156 that is housed in a tube 157 which is secured on the lever arm 141 to move therewith.

Integral with the lever 146 is a stud 149 (Fig. 8) on which is rotatably mounted the roller 150. The roller 150 engages in a slot 151 (Figs. 3, 6, and 7) which is provided in a rotatably adjustable plate 152 that is secured by screws 153 and a disc 158 to a sliding block 154. The block 154 is adjustably secured to the sliding base 20 as will be described more particularly hereinafter.

The plate 152 may be adjusted on the block 154 by rotation of the shaft 160 (Figs. 6 and 7) which is journaled in the sliding base 20. This shaft carries a worm 161 which meshes with a worm wheel segment 162 that is cut on the periphery of the plate 152. Adjustment of the plate 152 can be made precisely by use of the graduated dial 164 which is secured to shaft 160.

As will be obvious, as the shaft 130 revolves, the lever 146 will be rocked about its pivot 145 through action of cam 138. As the shaft 130 revolves, the lever arm 141 will also be rocked about its pivot 140 through action of the cam path 135. When the lever arm 141 is rocked about its pivot 140, the lever 146 will also be rocked about this same pivot 140. Since the lever arm 146 carries the roller 150 which engages in the slot 151 of plate 152, and since plate 152 is adjustably secured to block 154, and since block 154 is adjustably secured to sliding base 120, it will be obvious that when lever arm 141 is rocked, the sliding base 20 will be moved on the bed of the machine.

The cam path 135 rocks the lever arm 141, prior to cutting, to cause the work to be moved into engagement with the cutter, and after cutting, to cause the work to be disengaged from the cutter for indexing. If the member 152 is in the zero position of its adjustment, that is, if the slot 151 is perpendicular to the direction of movement of the sliding base 20, as shown in Fig. 6, the roller 150 of lever 146 will rock idly back and forth in slot 151 under actuation of cam 138 and the only movement imparted to the sliding base during a revolution of the shaft 130 will then be that caused by the cam path 135. If the member 152 is adjusted, however, so that the slot 151 is inclined at other than right angles to the direction of movement of the sliding base 20, as for instance if slot 151 is in the position shown in Fig. 7, then as the shaft 130 revolves, the lever arm 146 under actuation of cam 138 will impart movement to the sliding base 20. This movement will be additional to that effected by cam path 135, and will be determined by the angular setting of plate 152. It will take place during actual cutting of a tooth space of the work, and since it is in the direction of the axis of the cradle 17, will eliminate bias bearing as described in the Wildhaber Patent No. 1,980,365, above mentioned.

Where the helical motion is not employed, it is desirable to limit definitely the depth of engagement of the work with the cutter. For this purpose, a stop lug 170 (Figs. 6 and 7) is provided. This stop lug is secured to the adjustable plate 152 by screws 171. It is adapted to engage a stop member 172 that is secured to the bed 15 of the machine by a bolt 173 and dowel pins 173'. Both the stop lug 170 and the stop member 172 are V-shaped at their engaging portions so that the stop lug can readily clear the stop member when the plate 152 is adjusted angularly.

The depth of the tooth spaces, which are to be cut in the gear, may be adjusted by adjustment of the block 154. Adjustment of this block may be effected by rotation of the shaft 174 which is journaled in the sliding base 20 and which threads into the block 154.

After adjustment, the block 154 is secured in adjusted position by axial adjustment of the rod 176. This rod is mounted for axial movement in the sliding base 20 and has a tapered or wedge-shaped nose 177 at its inner end, as shown in Fig. 11. This tapered nose is adapted to enter a wedge-shaped slot provided in a member 178 which engages in one of the gibs 179 that serve to secure the block 154 to the sliding base 20. It will be obvious that when the rod 176 is adjusted inwardly, the member 178 will be forced upwardly to force the gib 179 upwardly and clamp the block 154 in any adjusted position. Rectilinear adjustment of the rod 176 is effected by rotation of the nut 175 which is rotatably adjustable in the sliding base 20 and which is internally threaded to engage an externally threaded portion of rod 176.

The sliding base 20 is not withdrawn sufficiently after each cutting operation by cam path 135 to permit removal of a completed gear from the machine and chucking of a new work-piece. To move the sliding base to and from loading position, a hand lever 185 (Figs. 3 and 8) is provided. This hand lever is secured to a shaft 186 that is journaled in the bed of the machine and it has an arm 187 at its inner end. A roller 188 is mounted on the arm 187 eccentrically of the axis of the shaft 186. This roller engages in the slot 136 of the control member 134. When the lever 185 is rocked in one direction or the other, the control member 134 is moved bodily axially on the shaft 130. This causes the lever arm 141 to be rocked about pivot stud 140, and thus, the sliding base is moved to or from loading position depending upon the direction in which the lever 185 is rocked.

The sliding base 20 is normally urged toward fully withdrawn or loading position by a coil spring 180 (Fig. 6). This spring is mounted in a tube 181 which is secured in the bed of the machine. This coil spring 180 engages the enlarged head of a rod 182 which is secured in the sliding base 20. The amount of tension on the spring 180 can be adjusted by adjustment of the nut 184 which threads into the bed of the machine and through which the rod 182 extends.

Figure 5:
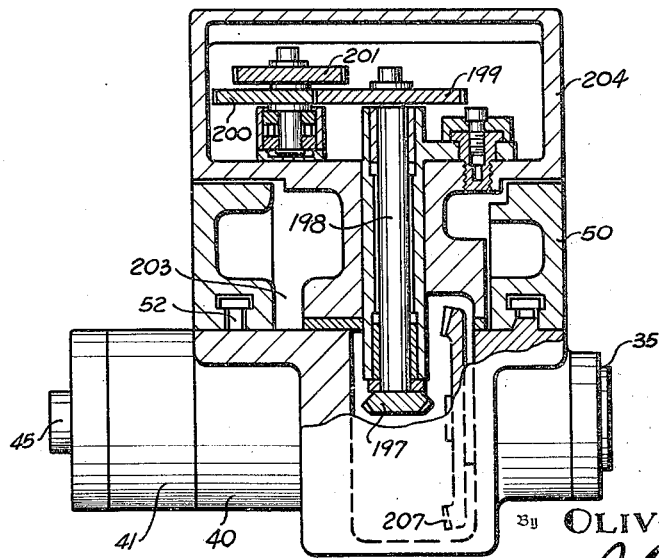
Fig. 5 is part plan, part transverse sectional view of the work head.

During operation of the machine, the work is driven continuously, the drive being from the shaft 123 (Fig. 12) through the mitre gears 190 and 191 (Figs. 1 and 12), the overhead telescoping shaft 192, the mitre gears 193 and 194 (Figs. 4 and 12), the shaft 195 which has telescoping engagement with the gear 194 and which is journaled coaxially in the sleeve member 61, the mitre gear 196 which is secured to the lower end of this shaft, the mitre gear 197, which is secured to a shaft 198 (Figs. 4, 5, and 12) which is journaled in a gear box 204, the change gears 199, 200, 201, and 202, the shaft 205, the bevel pinion 206 and the bevel gear 207. The latter is keyed to the work spindle 35 of the machine. The change gear box 204 has a portion which extends through an elongated opening 203 in the column 50 and which is fastened to work head 40. The change gears 199, 200, 201 and 202, which govern the number of teeth to be cut in the work, are enclosed in the change gear box 204. These change gears are lubricated through a line 208 (Fig. 3) which is connected to one side of piston 42. The lubricant exhausting from the change gear box flows back to the sump of the machine through a duct 209.

There is a plate 210 (Figs. 8, 9 and 12) secured to the shaft 130 to rotate therewith. This plate has a lug 211 formed on its rear face, and during each revolution of the plate this lug engages a lever 212, which is pivoted on a pin 213 in the bed 15, and rocks that lever about its pivot. This lever engages a plunger 215 of an electrically operated counter mechanism 214. The plate 210 revolves once for each cycle of operation of the machine. The counter mechanism is therefore tripped through the lever 212 once on each cycle of operation of the machine. The counter mechanism is set originally to stop the machine after the machine has made as many cycles as there are tooth spaces in the blank to be cut. Thus when a gear is completed, the machine is stopped.

The operation of the machine will be understood from the preceding description but may briefly be summed up here. Assuming that the required adjustments of the cutter and the work have been made to cut a gear of the desired spiral angle, cone distance and tooth depth, the operator moves the work into operative relation with the cutter by swinging the lever 185 (Fig. 3) in a counterclockwise direction, causing the control member 134 to be shifted forwardly on the shaft 130 thereby rocking the lever arm 141 on its pivot 140 and moving the sliding base into operative position. When the sliding base is in operative position, the machine may be started. The cutter is then driven continuously on its axis through operation of the gearing already described, and the cam shaft 130 and work spindle 35 are also then driven continuously through the gearing already described. As the cam shaft rotates, the cam path 135 engaging the roller 143 first causes the sliding base to be fed forwardly to move the work into engagement with the cutter. Then the generating roll begins and the cradle is rocked on its axis in one direction through the operation of the cam 100 and link member 104 in time with the work rotation. If the adjustable member 152 (Figs. 6 and 7) is in zero position, the sliding base dwells in its forward position, determined by stop 170 (Fig. 6), during the generating roll. If the adjustable member 152 has been adjusted, however, out of zero position, the lever 146 slowly feeds the work at a uniform rate either into or away from the cutter as the cutter rolls in engagement with the work. At the end of the generating roll, when a tooth space of the blank has been cut, the cam 100 causes the direction of movement of the cradle to be reversed and the cam path 135 causes the sliding base to be withdrawn to disengage the work from the cutter. The work will continue to rotate, however, in the same direction during the return roll of the cradle as during cutting. This operates to index the blank. When the return roll of the cradle has been completed, the cam path 135 operates to move the sliding base forward again to bring the work again into engagement with the cutter and the cycle begins anew. The operation of the machine is continuous with feed of the work into the cutter, generation, withdrawal, and return roll for each tooth space to be cut.

On each revolution of shaft 130, the lever 212 is operated to trip electrical counter 214. When the desired number of teeth have been cut in the gear, then, the machine is stopped. The operator can then withdraw the sliding base to loading position by use of lever 185 (Fig. 8), de-chuck the completed gear, and chuck a new blank.

While the invention has been described in connection with a particular embodiment thereof and in connection with the production of spiral bevel gears, it will be obvious that various features of the invention may be employed on machines for generating gears of other types and in fact may be employed on other types of machines. It is to be understood, therefore, that this application is intended to cover any adaptation or embodiment of the invention following, in general, the principles of the invention, and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for generating gears, a frame, a cradle oscillatably mounted on the frame, a work support reciprocably mounted on the frame, a face mill cutter journaled in the cradle, a work spindle journaled in the work support, means for rotating the cutter, means for rotating the work spindle continuously at a uniform velocity, means driven in time with the last named means for oscillating the cradle to impart thereto alternate generating and return movements, means for reciprocating the work support to move the work into and out of engagement with the cutter and so operated that the work is in engagement with the cutter during the generating movements of the cradle and is out of engagement with the cutter during the return movements of the cradle.

2. In a machine for generating gears, a frame, a cradle oscillatably mounted on the frame, a slide mounted on the frame for movement toward and from the cradle in the direction of the axis of the cradle, a tool support mounted on the cradle, a face mill gear cutter journaled in the tool support, a work support mounted on the slide, a work spindle journaled in the work support, means for rotating the cutter, means for rotating the work spindle continuously at a uniform velocity, means driven in time with the last named means for oscillating the cradle to impart thereto alternate generating and return movements, means for reciprocating the slide to move the work into and out of engagement with the cutter and so operative that the work is in engagement with the cutter during the generating movements of the cradle and is out of engagement with the cutter during the return movements of the cradle, and separate means for moving the slide in time with the cradle during the generating movements of the cradle.

3. In a machine for generating gears, a frame, a cradle oscillatably mounted on the frame, a work support reciprocably mounted on the frame, a work spindle journaled in the work support, a face mill gear cutter journaled in the cradle, means for rotating the cutter, means for rotating the work spindle continuously at a uniform velocity, means for oscillating the cradle comprising a rotary plate, a cam eccentrically mounted on the plate, a lever pivotally mounted in the frame and engaging the cam at one end, a link adjustably connected at one end to the opposite end of the lever and adjustably connected at its opposite end to the cradle, and means for rotating the plate continuously at a uniform velocity in time with the means for rotating the work spindle.

4. In a machine for generating tapered gears, a frame, a work support, a tool support, a cradle oscillatably mounted on the frame and on which one of said supports is mounted, a slide mounted on the frame for movement in the direction of the axis of the cradle and on which the other support is mounted, a work spindle journaled in the work support, a face mill gear cutter journaled in the tool support, means for rotating the cutter, means for rotating the cradle and work spindle in timed relation to effect generation of the tooth profiles, a rotary cam journaled in the frame, a lever operatively connected to the cam, a block mounted on the slide having a diametral slot therein in which the lever engages to operatively connect the cam with the slide, said block being adjustable to vary the angle of inclination of the slot to the direction of movement of the slide, thereby to vary the amount of movement of the slide during rotation of the cam, and means for rotating the cam in time with the rotary movements of the cradle and work spindle.

5. In a machine for producing tapered gears, a frame, a work support, a tool support, a cradle oscillatably mounted on the frame and on which one of said supports is mounted, a slide mounted on the frame for movement in the direction of the axis of the cradle and on which the other support is mounted, a work spindle journaled in the work support, a face mill gear cutter journaled in the tool support, means for rotating the cutter, means for rotating the cradle and work spindle in timed relation to generate the tooth profiles, a lever pivotally mounted in the frame, means driven in time with the generating motion for rocking said lever about its pivot through a given angle, adjustable means for connecting the lever with the slide and operable in one position to permit said rocking movement without transmission of any motion to the slide and operable in other positions to cause varying amounts of motion to be transmitted to the slide during the rocking movement of the lever.

6. In a machine for generating tapered gears, a frame, a work support, a tool support, a cradle oscillatably mounted on the frame and on which one of said supports is mounted, a slide mounted on the frame for movement in the direction of the axis of the cradle and on which the other support is mounted, a work spindle journaled in the work support, a face mill gear cutter journaled in the tool support, means for rotating the cutter, means for rotating the cradle and work spindle in timed relation to effect generation of the tooth profiles, a pivoted lever operatively connected to the slide, means for rocking the lever about its pivot to impart movement to the slide during generation, and means for moving the lever bodily to move the slide toward or from the cradle to move the work into or out of engagement with the cutter.

7. In a machine for producing tapered gears, a frame, a work support, a tool support, a cradle oscillatably mounted on the frame and on which one of said supports is mounted, a slide mounted on the frame for movement in the direction of the axis of the cradle and on which the other support is mounted, a work spindle journaled in the work support, a face mill gear cutter journaled in the tool support, means for rotating the cutter, means for rotating the cradle and work spindle in timed relation to generate the tooth profiles, a pivoted lever, means driven in time with the generating motion for rocking said lever about its pivot through a given angle, adjustable means for connecting the lever with the slide and operable in one position of its adjustment to permit said rocking movement of the lever without transmission of any motion to the slide and operable in other positions of its adjustment to cause varying amounts of movement to be transmitted to the slide during oscillating movement of the lever, and means for rocking the lever about a separate pivot to move the work into and out of engagement with the cutter.

8. In a machine for producing tapered gears, a frame, a work support, a tool support, a cradle oscillatably mounted on the frame and on which one of said supports is mounted, a slide mounted on the frame for movement in the direction of the axis of the cradle and on which the other support is mounted, a work spindle journaled in the work support, a face mill gear cutter journaled in the tool support, means for rotating the cutter, means for rotating the cradle and work spindle in timed relation to generate the tooth profiles, a rotary cam, means for driving said cam in time with the generating motion, a lever pivoted on the frame and operatively connected to said cam to rock on rotation of the cam, a second lever pivotally mounted on the first lever and operatively connected to the slide to impart movement to the slide on oscillation of the first lever about its pivot, and separate means for rocking the second lever about its pivot to impart added motion to the slide.

9. In a machine for producing tapered gears, a frame, a work support, a tool support, a cradle oscillatably mounted on the frame and on which one of said supports is mounted, a slide mounted on the frame for movement in the direction of the axis of the cradle and on which the other support is mounted, a work spindle journaled on the work support, a face mill gear cutter journaled in the tool support, means for rotating the cutter, means for rotating the cradle and work spindle in timed relation to generate the tooth profiles, a rotary cam, means for driving said cam in time with the generating motion, a lever pivoted on the frame and operatively connected to said cam to rock on rotation of the cam, a second lever pivotally mounted on the first lever, a second cam driven in time with the generating motion and operatively connected to said second lever to rock said second lever on its pivot on rotation of said second cam, means operatively connecting the second lever to the slide to impart movement to the slide on oscillation of the first lever about its pivot, said means being adjustable to permit the movement of the second lever to be transmitted to the slide also to impart additional movement to the slide.

10. In a machine for producing gears, a frame, a work support, a tool support, a slide reciprocably mounted on the frame and on which one of said supports is mounted, a rotary cam, a lever pivotally mounted on the frame and operatively connected both to the slide and to the cam to effect reciprocation of the slide on rotation of the cam to effect relative movement between the tool and the work and through a limited path to move them relatively into and out of operative engagement, and means for moving the cam axially to effect relative movement between the tool and the work beyond said limited path to move the support, which is carried by the slide, from operative to loading position and vice versa.

11. In a machine for producing tapered gears, a frame, a work support, a tool support, a cradle oscillatably mounted on the frame and on which one of said supports is mounted, a slide mounted on the frame for movement in the direction of the axis of the cradle and on which the other support is mounted, a work spindle journaled in the work support, a face mill gear cutter journaled in the tool support, means for rotating the cutter, means for rotating the cradle and work spindle in timed relation to generate the tooth profiles, a rotary control member having a peripheral cam path and a peripheral groove formed therein, a cam secured to the rotary control member to move therewith, a shaft to which the control member is fixed for rotation but on which the control member is axially slidable, a lever pivoted on the frame, a follower secured to said lever and engaging in said cam path, a second lever pivotally mounted on the first lever, means operatively connecting the second lever to the slide, a follower carried by the second lever and engaging said cam, said cam path being formed to move the slide toward and from the cradle to move the work into and out of engagement with the tool, said cam being formed to impart movement to the slide during generation, and a third lever pivoted on the frame and having a roller thereon engaging in a peripheral groove of the control member, said third lever being operable to move the control member axially to move the work to and from loading position.

12. In a machine for producing gears, a frame, a work support, a tool support, a cradle oscillatably mounted on the frame and on which one of said supports is mounted, a slide mounted on the frame for movement in the direction of the axis of the cradle and on which the other support is mounted, a work spindle journaled in the work support, a face mill gear cutter journaled in the tool support, means for rotating the cutter, means for rotating the cradle and the work spindle in timed relation to generate the tooth profiles, a member mounted on the slide and having a guide surface formed thereon, said member being adjustable to position said guide surface at any desired angle to the path of movement of the slide, means movable on the guide surface and operative to impart movement to the slide, the amount of said movement depending upon the angular position of the guide surface, a stop lug carried by said adjustable member, and a stop mounted on the frame and adapted to be engaged by the lug in the zero position of adjustment of said member to limit the movement of the slide toward the cradle to control the depth of the tooth spaces to be cut into the work.

13. In a machine for producing gears, a frame, a work support, a tool support, a cradle oscillatably mounted on the frame and on which one of said supports is mounted, a slide mounted on the frame for movement in the direction of the axis of the cradle and on which the other support is mounted, a work spindle journaled in the work support, a face mill gear cutter journaled in the tool support, means for rotating the cutter, means for rotating the cradle and work spindle in timed relation to generate the tooth profiles, a block adjustable on the slide in the direction of the axis of the cradle, a plate having a guide surface formed thereon, said plate being adjustable angularly on the block to position the guide surface at any desired angle to the direction of movement of the slide, a member movable in a plane at right angles to the direction of movement of the slide and engaging said guide surface to impart movement to the slide when the guide surface is inclined at other than right angles to the path of movement of the slide, separate means for moving the slide to and from operative position, a stop on the frame, and a stop lug mounted on the plate and adapted to engage said stop when the plate is in the zero position of its adjustment to limit inward movement of the slide toward the cradle under actuation of the last named means.

OLIVER F. BAUER.

REFERENCES CITED

The following references are of record in the file of this patent:

UNITED STATES PATENTS

| Number | Name | Date |
|---|---|---|
| 1,590,466 | Logue | June 29, 1926 |
| 1,964,800 | Hill | July 3, 1934 |
| 1,969,843 | Head | Aug. 14, 1934 |
| 2,145,000 | Wildhaber | Jan. 24, 1939 |
| 2,253,683 | Bryan | Aug. 26, 1941 |
| 2,264,497 | Agan | Dec. 2, 1941 |
| 2,302,004 | Carlsen | Nov. 17, 1942 |
| 2,339,375 | Cassel | Jan. 18, 1944 |
| 2,352,689 | Carlsen | July 4, 1944 |
| 2,354,181 | Carlsen et al. | July 25, 1944 |
| 2,370,882 | Serna | Mar. 6, 1945 |